Patented May 16, 1939

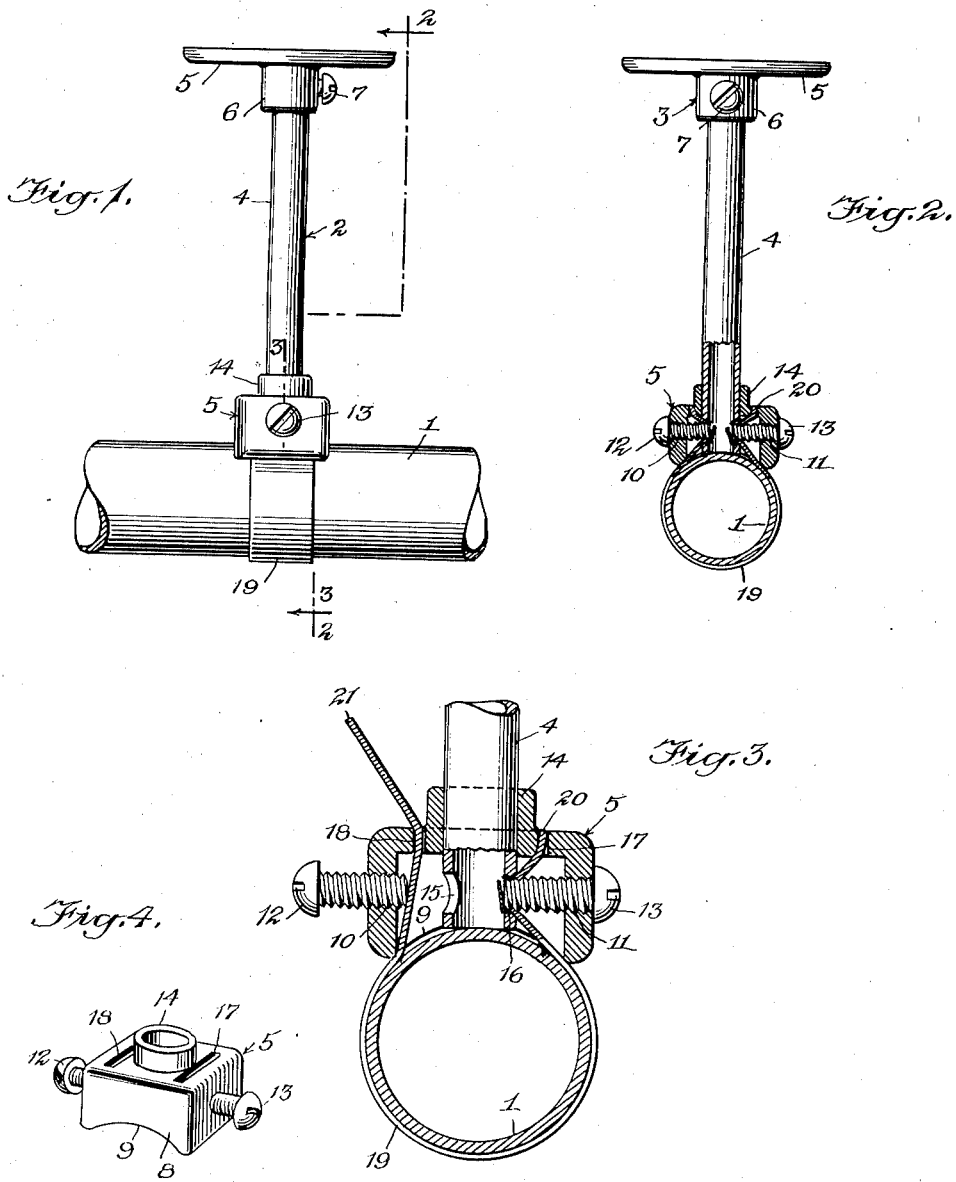

2,158,802

UNITED STATES PATENT OFFICE 2,158,802

PIPE HANGER

Osgood M. Redlon, Bath, Maine

Application April 19, 1938, Serial No. 202,848

5 Claims. (Cl. 248—62)

This invention relates to pipe hangers and has for an object to provide an improved construction which may be readily applied or removed.

Another object of the invention is to provide a pipe hanger wherein a flexible encircling and clamping band may be easily placed in position through the use of a screwdriver or similar instrument.

A more specific object of the invention is to provide a pipe hanger wherein the length of the hanger may be readily adjusted and also wherein the size of the clamping band may be varied to suit the particular pipe involved.

In the accompanying drawing—

Fig. 1 is a side view of a pipe hanger shown associated with a pipe, the hanger disclosing an embodiment of the invention;

Fig. 2 is a sectional view through Fig. 1 approximately on the line 2—2;

Fig. 3 is an enlarged fragmentary sectional view through Fig. 1 approximately on the line 3—3;

Fig. 4 is a perspective view of a fitting embodying certain features of the invention.

Referring to the accompanying drawing by numerals, 1 indicates a pipe which is adapted to be supported by a hanger 2, which hanger is formed from three principal members, namely, a wall or ceiling fitting, a supporting stem 4, and a clamping fitting 5. The stem 4 may be a tube as indicated in Fig. 2 or, if desired, it may be solid. The fitting 3 is provided with a base 5 which is preferably formed with two apertures (not shown) wherein screws may be used to clamp the fitting to a ceiling, wall, or other support. The base 5 is provided with an integral upstanding tubular member 6 clamped to the stem or standard 4 by suitable clamping screws 7. By reason of this construction the fitting 3 may be clamped to the standard 4 at any point along its length and, consequently, this standard may be cut off so as to support the pipe 1 at any desired height from the ceiling or other support. The fitting 5 may be a casting or a forging, or may be formed in some other way, but when complete is provided with a housing 8 which may be circular but preferably is rectangular with two sides having arc-shaped portions 9 adapted to fit against the pipe 1. The sides at right angles to the sides carrying the curved portions 9 are provided with threaded apertures 10 and 11 for receiving the clamping screws 12 and 13. The housing 8 is also provided with a sleeve 14 which is preferably integral with the remaining part and which slidingly fits on the lower part of the standard 4. Where the standard 4 is a pipe, there are provided holes or apertures 15 and 16, but where the pipe is solid one hole as large as aperture 15 is provided arranged to extend entirely through the standard. The housing 8 is also provided with slots or apertures 17 and 18 for receiving a clamping band or strip 19, which may be copper, brass, iron, steel, or other metal. Preferably this band, however, is of comparatively soft metal, as for instance copper, so that it may properly engage not only an iron pipe or a composition pipe, but a brass or copper pipe, and properly clamp the same to the fitting 5. The strip or band 19 is preferably straight to start with and is threaded through aperture 17 until the end is approximately flush with the top of housing 8. Screw 13 is then actuated until the parts are moved to the position shown in Fig. 3. It will be seen that the screw punches a hole in the strip and forces part of the same into the aperture 16. Also if the band is soft the screw cuts threads therein so that the end 20 of the strip 19 is held firmly in place. If desired, a hole could be previously punched in the strip 19 so as to make it easier for the screw 13 to be moved to the position shown in Fig. 3.

After one end of the strip has been applied as just described, the hanger is ready for use, and when it is desired to employ the same it may be mounted on a suitable support and the strip or band 19 passed around pipe 1 and then threaded upwardly through the aperture 18. Preferably the strip is of sufficient length to permit the free end 21 to project some little distance beyond the aperture 18 so that it may be grasped by the hand or by a pair of pliers and pulled tightly to the position shown in Fig. 3. Also this strip is preferably bent at a slight angle, as shown in Fig. 3, and then the screw 12 tightened. Preferably the screw is operated until some of the strip 19 has been forced into the aperture 15. This will draw up on the strip or strap so as to clamp the same tightly. After the screw 12 has been moved to the position shown in Fig. 2, the free end 21 is cut off by snips or other instrument so that the free end will be substantially flush with the outer end of the aperture 18. This completes the mounting of the hanger.

In case it should be desired to remove the strip or band 19 in order to substitute a new pipe 1, both of the screws 12 and 13 would be loosened and the strip 19 completely removed and a new one provided. After the new pipe is mounted the new strap is adjusted to the position shown in Fig. 3 and then to the position shown in Fig. 2. It is not essential that the arc-shaped portions 9 be the same curvature as pipe 1, though ordinarily they are approximately the same curvature.

It will be noted that the hanger may be adjusted as to length and the strip or band 19 adjusted and clamped in position to various size pipes through the use of only three screws.

I claim:

1. A pipe hanger comprising a standard, a fitting slidingly mounted on the end of said standard, a flexible deformable metal strap extending through said fitting in position to encircle a pipe, and clamping screws carried by the fitting for deforming parts of said strap for clamping the strap in position and simultaneously securing the fitting rigidly to said standard.

2. A pipe hanger including a standard having a passageway therethrough at one end, a fitting at the end of said standard, said fitting being provided with a pair of slots extending parallel to the standard, a deformable clamping strap encircling the pipe, said strap having its respective ends extending through said slots, and a pair of clamping screws for deforming parts of said strap so that the deformed parts will extend into said passageway for securing said strap to said standard and at the same time securing the fitting to the standard.

3. A pipe hanger including a tubular standard having a pair of apertures adjacent one end, a housing surrounding the apertured end of said standard, said housing having a pair of slots on diametrally opposite sides, a deformable flexible metallic strap positioned so that the ends will extend through said slots while the strap is adapted to encircle a pipe, and a pair of screws carried by said housing and positioned to deform and force the deformed portions of said strap into said apertures for clamping the strap firmly to the pipe and at the same time clamping the housing to the standard.

4. A pipe hanger including a standard having a formation presenting an opening therein which forms a passageway therethrough, a housing having a pair of openings, said housing loosely mounted on the end of said standard and surrounding said opening, a deformable flexible metallic strap having a loop adapted to fit over a pipe and the ends extending through said openings in said housing, and a pair of screws for deforming and forcing the deformed portions of said strap adjacent the ends into the passageway in said standard.

5. In a pipe hanger, a standard, a deformable strap, a strap-clamping fitting carried by said standard, said standard having a pair of apertures, said fitting including a housing formed with a tubular portion surrounding said standard adjacent said apertures, a top having a pair of slots arranged parallel to said standard through which the ends of said strap are adapted to extend and a pair of depending side walls positioned opposite the apertures in said standard, and a screw arranged in each of said walls positioned to deform and force the deformed portions of said strap into the apertures in said standard for clamping the strap in operative position.

OSGOOD M. REDLON.